US012105435B2

(12) United States Patent
Suzuki et al.

(10) Patent No.: US 12,105,435 B2
(45) Date of Patent: Oct. 1, 2024

(54) CONDUCTIVE ROLLER

(71) Applicant: NOK CORPORATION, Tokyo (JP)

(72) Inventors: Shogo Suzuki, Kanagawa (JP); Satoshi Fukuoka, Kanagawa (JP); Kenji Sasaki, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 18/016,971

(22) PCT Filed: May 10, 2021

(86) PCT No.: PCT/JP2021/017768

§ 371 (c)(1),
(2) Date: Jan. 19, 2023

(87) PCT Pub. No.: WO2022/018934

PCT Pub. Date: Jan. 27, 2022

(65) Prior Publication Data

US 2023/0288835 A1 Sep. 14, 2023

(30) Foreign Application Priority Data

Jul. 20, 2020 (JP) ................................ 2020-123485

(51) Int. Cl.
*G03G 15/02* (2006.01)
*G03G 15/08* (2006.01)
*G03G 15/16* (2006.01)

(52) U.S. Cl.
CPC ..... *G03G 15/0233* (2013.01); *G03G 15/0818* (2013.01); *G03G 15/1685* (2013.01)

(58) Field of Classification Search
CPC ................................................ G03G 15/0233
See application file for complete search history.

(56) References Cited

U.S. PATENT DOCUMENTS 5,571,457 A 11/1996 Vreeland et al.
2011/0299887 A1* 12/2011 Miyaji .................. G03G 15/75 399/176
2018/0364604 A1 12/2018 Fujino et al.

FOREIGN PATENT DOCUMENTS

EP 3 933 220 1/2022
JP 2003-202722 A 7/2003
(Continued)

OTHER PUBLICATIONS

JP_3921914_B2_t Machine Translation, Japan, 2000, Hiramatsu.*
(Continued)

*Primary Examiner* — Carla J Therrien
(74) *Attorney, Agent, or Firm* — GREENBLUM & BERNSTEIN, P.L.C.

(57) ABSTRACT

A conductive roller includes a base including an outer surface along and about an axial line thereof, and a surface layer arranged on the outer surface of the base. The surface layer includes particles. The ten-point height of irregularities Rz of the outer surface of the base is greater than or equal to 6.0 micrometers and less than or equal to 8.0 micrometers. A ten-point height of irregularities Rz of an outer surface of the surface layer is greater than or equal to 5.5 micrometers and less than or equal to 8.5 micrometers. The base included in the conductive roller preferably includes a core member and a conductive elastic layer arranged between the core member and the surface layer. The surface layer preferably includes a conductive portion including a resin material and a conductive agent.

5 Claims, 2 Drawing Sheets

(56) References Cited

FOREIGN PATENT DOCUMENTS

| | | | | |
|---|---|---|---|---|
| JP | 2004-306519 | A | | 11/2004 |
| JP | 2004-309910 | | | 11/2004 |
| JP | 3655364 | B2 | | 6/2005 |
| JP | 3921914 | B2 | * | 5/2007 |
| JP | 2008-276022 | | | 11/2008 |
| JP | 2019-3171 | A | | 1/2019 |
| JP | 2020-34654 | | | 3/2020 |

OTHER PUBLICATIONS

ISR for PCT/JP2021/017768, dated Jul. 13, 2021 (w/ translation).

Extended European Search Report for European Patent Application No. 21846758.7, dated Jul. 1, 2024.

* cited by examiner

CONDUCTIVE ROLLER

TECHNICAL FIELD

The present invention relates to a conductive roller.

BACKGROUND ART

There is known an image forming apparatus such as an electrophotographic copier. Such an image forming apparatus forms a latent image on a surface of a charged photoreceptor by exposure, and then develops the latent image by adhering toner to the latent image, and then transfers the developed image to a sheet of paper for recording, for example. Generally, image quality is improved by evenly charging a surface of a photoreceptor. As a method of charging a photoreceptor, for example, a method is known in which a charging roller is brought close to a surface of the photoreceptor.

Patent Document 1 discloses a conductive roller used as a charging roller. The conductive roller includes a support and a coating layer that covers the support. The coating layer includes an elastic layer formed on an outer periphery of the support, and a surface layer formed on an outer periphery of the elastic layer. The elastic layer includes synthetic rubber. The coating layer includes resin. In addition, the coating layer includes insulating particles and a conductive agent used to adjust electrical resistance of the conductive roller.

In Patent Document 1, roughness of the surface layer that is a conductive member is greater than that of the elastic layer. Specifically, by increasing both average particle size of the insulating particles and amount of the insulating particles, the roughness of the surface layer is greater than that of the elastic layer. By roughening the surface layer to make a portion that discharges preferentially, image unevenness is reduced.

RELATED ART DOCUMENT

Patent Document

Patent Document 1: Japanese Patent Application Laid-Open Publication No. 2004-306519

SUMMARY OF THE INVENTION

Problem to be Solved by the Invention

However, as the amount of insulating particles increases, the density of insulating particles increases. Consequently, the electrical resistance of the charging roller increases excessively. As a result, discharge is reduced, thereby posing difficulty in obtaining electric potential required for the surface of the photoreceptor. Thus, it is difficult for the surface of the photoreceptor to be evenly charged, thereby posing difficulty in sufficiently reducing image unevenness. Therefore, a need has existed for a new configuration for reducing occurrence of image unevenness.

Means of Solving the Problem

To solve the above problem, a conductive roller according to one aspect of the present invention includes: a base including an outer surface along and about an axial line thereof; and a surface layer arranged on the outer surface of the base. The surface layer includes particles. A ten-point height of irregularities Rz of the outer surface of the base is greater than or equal to 6.0 micrometers and less than or equal to 8.0 micrometers. A ten-point height of irregularities Rz of an outer surface of the surface layer is greater than or equal to 5.5 micrometers and less than or equal to 8.5 micrometers.

Effect of Invention

According to the present invention, it is possible to reduce occurrence of image unevenness.

MODES FOR CARRYING OUT THE INVENTION

Figure 1:
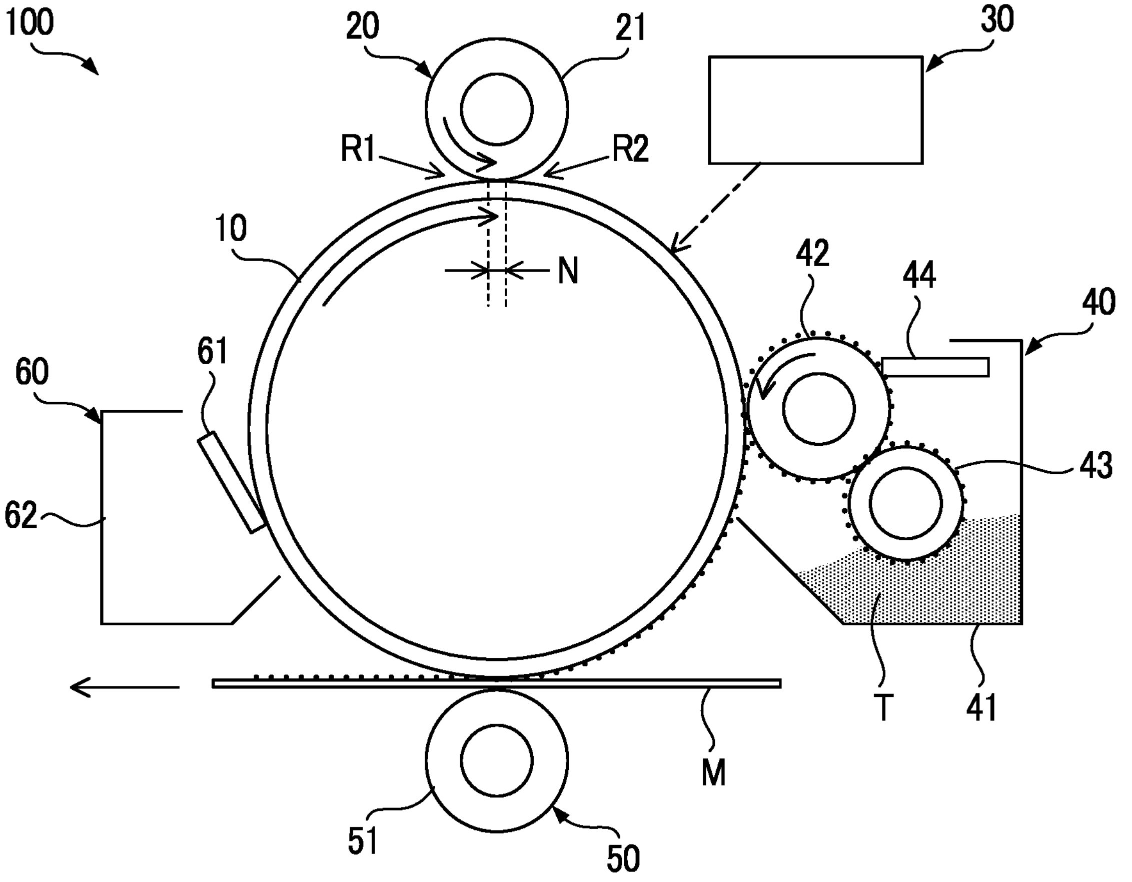
FIG. 1 is a schematic diagram showing an image forming apparatus with a conductive roller according to an embodiment.

A preferred embodiment according to the present invention will be described with reference to the accompanying drawings. In the drawings, dimensions and a scale of elements may differ from those of actual products, and some elements may be shown schematically to facilitate understanding. The scope of the present invention is not limited to the embodiments described below unless the following explanation includes a description that specifically limits the scope of the present invention.

1. Image Forming Apparatus 100

FIG. 1 is a schematic diagram showing an image forming apparatus 100 with a conductive roller according to an embodiment. The image forming apparatus 100 is an apparatus, such as a copier or a printer, which forms an image on a recording medium M such as a sheet of paper for printing by an electrophotographic method.

As shown in FIG. 1, the image forming apparatus 100 includes a photoreceptor 10, a charging device 20, an exposure device 30, a developing device 40, a transfer device 50, a cleaning device 60, and a fusing device (not shown). Among the devices, the charging device 20, the exposure device 30, the developing device 40, the transfer device 50, and the cleaning device 60, are arranged in a circumferential direction of the photoreceptor along an outer surface of the photoreceptor 10, in this order.

The photoreceptor 10 includes, as an outermost layer, a photosensitive layer formed of a photoconductive insulating material such as an organic photoconductor (OPC), for example, the photoreceptor 10 in FIG. 1 is a cylindrical or columnar member (photoreceptor drum) configured to rotate about an axial line of the photoreceptor 10.

The charging device 20 is a device configured to have the outer surface of the photoreceptor 10 electrically charged evenly by corona discharge, etc. In the example shown in FIG. 1, the charging device 20 includes a charging roller 21, which is an example of the conductive roller, and in addition, the charging device 20 is configured to generate corona discharge, etc., between the charging roller 21 and the photoreceptor 10.

The exposure device 30 is a device configured to form an electrostatic latent image on the outer surface of the photoreceptor 10 by exposing the outer surface of the photoreceptor 10 using light such as laser light in accordance with image information from an external device such as a personal computer.

The developing device 40 applies toner T to the electrostatic latent image formed on the outer surface of the photoreceptor 10 to visualize the latent image as a toner image, for example, the developing device 40 in FIG. 1 includes a container 41 configured to contain the toner T therein, a developing roller 42 configured to carry the toner T, a toner supply roller 43 configured to supply the toner T to the developing roller 42, and a regulation blade 44 configured to regulate an amount of the toner T carried by the developing roller 42.

The transfer device 50 is a device configured to transfer the toner image formed on the photoreceptor 10 to the recording medium M. In the example shown in FIG. 1, the transfer device 50 includes a transfer roller 51, and applies a predetermined bias to the transfer roller 51 to transfer the toner image on the photoreceptor 10 to the recording medium M conveyed between the photoreceptor 10 and the transfer roller 51.

The recording medium M on which the toner image has been transferred is heated and pressed by the fusing device (not shown). Thus, the toner image is fixed to the recording medium M. The fusing device is not particularly limited, and it may be one of various types of commonly known fusing devices including a fusing device using a roller fixing method, a fusing device using a film fixing method, a fusing device using a flash fixing method, etc.

The cleaning device 60 is a device configured to remove the toner T that remains on the outer surface of the photoreceptor 10 after the transfer process. In the example shown in FIG. 1, the cleaning device 60 includes a cleaning blade 61 configured to scrape the toner T off the outer surface of the photoreceptor 10, and a collector 62 configured to collect the toner T scraped off by the cleaning blade 61.

2. Charging Roller 21

Figure 2:
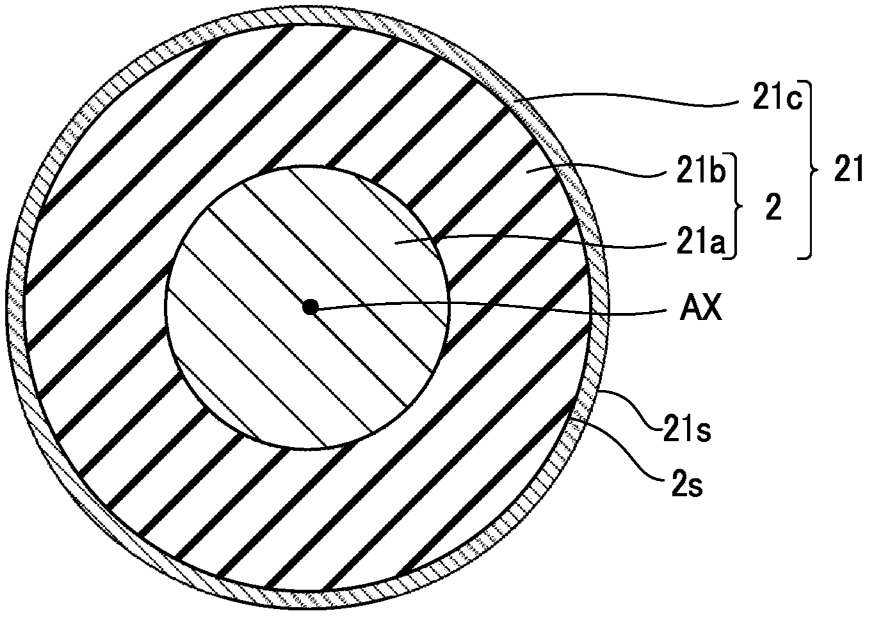
FIG. 2 is a cross-sectional view of a charging roller, which is an example of the conductive roller according to the embodiment.

FIG. 2 is a cross-sectional view of the charging roller 21, which is an example of the conductive roller according to the embodiment. As shown in FIG. 2, the charging roller 21 includes a base 2 and a surface layer 21*c*. Each of the elements of the charging roller 21 will be described sequentially.

2-1. Base 2

The base 2 is a columnar or cylindrical member including an outer surface 2*s* along and about an axial line AX of the base 2. The base 2 includes a core member 21*a* and an elastic layer 21*b*. The elastic layer 21*b* is interposed between the core member 21*a* and the surface layer 21*c*.

2-1a. Core Member 21a

The core member 21*a* is a columnar or cylindrical conductive member. The core member 21*a* has two ends, each of which may be provided with a shaft member for bearings, as appropriate.

A material for the core member 21*a* is not particularly limited, and it may be formed of a metal or a resin material with excellent thermal conductivity and mechanical strength. Specifically, examples of the material for the core member 21*a* include a metallic material such as a stainless steel material, a nickel (Ni) material, a nickel alloy material, an iron (Fe) material, a magnetic stainless steel material, a cobalt-nickel (Co—Ni) alloy material, etc., and a resin material such as a polyimide resin (PI) material, etc. The core member 21*a* may be formed by using one of these materials alone, or alternatively, by using a combination of two or more of these materials in a mixture, in a lamination, or in an alloy, etc.

The core member 21*a* is manufactured by, for example, a commonly known machining technique such as cutting. The surface of the core member 21*a* may undergo surface treatment such as blasting treatment or plating treatment, as appropriate.

2-1b. Elastic Layer 21b

The elastic layer 21*b* is arranged over the entire outer surface of the core member 21*a*, and in addition, the elastic layer 21*b* is a layer having conductivity and elasticity. The elastic layer 21*b* is elastically deformed by contact between the charging roller 21 and the photoreceptor 10. In the region R1 or R2 close to the nip N formed by the contact between the charging roller 21 and the photoreceptor 10, the elastic deformation makes a distance between the outer surface of the charging roller 21 and the outer surface of the photoreceptor 10 equal in a direction along the axial line AX.

In the example shown in FIG. 2, the elastic layer 21*b* is a single layer; however, the elastic layer 21*b* may be a laminate having two or more layers. Between the core member 21*a* and the elastic layer 21*b*, another layer such as an adhesive layer that bonds these layers to each other, a sealing layer that improves sealing of these layers, or an adjustment layer that adjusts a surface condition of the core member 21*a*, may be interposed as appropriate.

Thickness of the elastic layer 21*b* is not particularly limited, and it may be, in order to achieve appropriate elasticity of the elastic layer 21*b*, for example, in a range of 0.5 mm or greater and 5 mm or less, and may be preferably in a range of 1 mm or greater and 3 mm or less.

The elastic layer 21*b* is formed of, for example, a rubber composition in which a conductivity imparting agent is added to a rubber material. The elastic layer 21*b* may be a dense member formed of the rubber composition, or it may be a foam member formed of the rubber composition.

The rubber material is not particularly limited, and it may be, for example, a synthetic rubber material such as a polyurethane rubber (PUR) material, an epichlorohydrin rubber (ECO) material, a nitrile rubber (NBR) material, a styrene rubber (SBR) material, or a chloroprene rubber (CR) material, etc., and in addition, one of these materials may be used alone, or alternatively, a combination of two or more of these materials may be used in a copolymer or in a blend, etc.

The rubber material is not limited to a synthetic rubber material, and it may be a thermoplastic elastomer material. An additive such as a crosslinking agent or a crosslinking aid, etc., may be added to the rubber material, as appropriate. The crosslinking agent is not particularly limited, and examples of the crosslinking agent include sulfur and a peroxide vulcanizing agent, etc. Examples of the crosslinking aid include inorganic materials, such as zinc oxide and magnesium oxide, and organic materials, such as stearic acid and amines.

The conductivity imparting agent is not particularly limited, and examples of the conductivity imparting agent include an electronic conductivity imparting agent and an ionic conductivity imparting agent, and in addition, a combination of two or more of these agents may be used in a mixture, etc. The electronic conductivity imparting agent is not particularly limited, and examples of the electronic conductivity imparting agent include carbon black and metal powder, etc., and in addition, one of them may be used alone, or a combination of two or more thereof may be used. The ionic conductivity imparting agent is not particularly limited, and examples of the ionic conductivity imparting agent include an organic salt, an inorganic salt, a metal complex, and an ionic liquid. An example of the organic salt includes a sodium trifluoride acetate material, etc. Examples of the inorganic salt include a lithium perchlorate material and a quaternary ammonium salt, etc. An example of the metal complex includes a ferric halide-ethylene glycol material, as shown in Japanese Patent No. 3655364. The ionic liquid is a molten salt that is liquid at room temperature, and that has a melting point of 70 degrees Celsius or less, preferably 30 degrees Celsius or less, as shown in Japanese Patent Application Laid-open Publication No. 2003-202722.

A durometer hardness of the elastic layer 21*b* is preferably in a range of 50° or greater and 64° or less. The durometer hardness of the elastic layer 21*b* is in this range, so that the effects of the shape of the surface layer 21*c* described below can be appropriately achieved. The durometer hardness is measured by use of a durometer "Type A" according to JIS K 6253 or ISO 7619.

The elastic layer 21*b* described above is formed by, for example, extrusion molding. This molding may be insert extrusion molding in which the core member 21*a* is used as an insert. In this case, joining of the core member 21*a* and the elastic layer 21*b* is performed simultaneously with the forming of the elastic layer 21*b*. Alternatively, the elastic layer 21*b* may be formed by bonding a sheet-shaped or tubular member, which is formed of the rubber composition described above, to the outer surface of the core member 21*a*. In forming the elastic layer 21*b*, thickness and surface roughness of the elastic layer 21*b* may be appropriately adjusted by grinding the outer surface of the elastic layer 21*b* using a grinding machine, etc., as appropriate.

The elastic layer 21*b* may be omitted. In a case in which the elastic layer 21*b* is omitted, the base 2 consists of the core member 21*a*.

2-2. Surface Layer 21*c*

The surface layer 21*c* is arranged on the outer surface 2*s* of the base 2. Specifically, the surface layer 21*c* is arranged over the entire outer surface 2*s* of the base 2. The surface layer 21*c* is an outermost layer of the charging roller 21. Therefore, the outer surface 21*s* of the surface layer 21*c* is an outermost surface of the charging roller 21.

The surface layer 21*c* is a conductive layer. The outer surface 21*s* is roughened. Therefore, corona charging is evenly generated between the charging roller 21 and the photoreceptor 10, compared to a configuration in which the outer surface 21*s* is a smooth surface.

Figure 3:
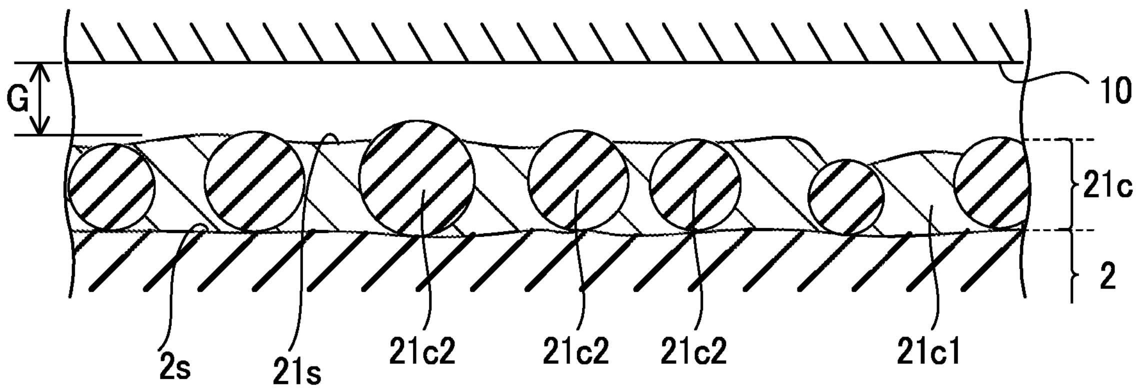
FIG. 3 is an enlarged cross-sectional view explaining a surface layer of the charging roller.

FIG. 3 is an enlarged cross-sectional view explaining the surface layer 21*c* of the charging roller 21. As shown in FIG. 3, the surface layer 21*c* includes a conductive portion 21*c*1 and a plurality of surface roughness imparting materials 21*c*2. The surface roughness imparting materials 21*c*2 are arranged in the conductive portion 21*c*1. The conductive portion 21*c*1 serves a function of generating electric discharge at the region R1 or R2 between the conductive portion 21*c*1 and the outer surface of the photoreceptor 10, and a function as a binder that fixes the surface roughness imparting materials 21*c*2, which are in a dispersed state, to the elastic layer 21*b*. On the other hand, the surface roughness imparting materials 21*c*2 serve a function of roughening the surface of the surface layer 21*c*. The conductive portion 21*c*1 and the surface roughness imparting materials 21*c*2 will be described in order in detail.

The conductive portion 21*c*1 is formed of a conductive resin composition in which a conductive agent is added to a resin material that is a base material. The resin composition may include another additive such as a modifier, etc.

The resin material is not particularly limited, and examples of the resin material include an urethane resin material, an acrylic resin material, an acrylic urethane resin material, an amino resin material, a silicone resin material, a fluororesin material, a polyamide resin material, an epoxy resin material, a polyester resin material, a polyether resin material, a phenolic resin material, a urea resin material, a polyvinyl butyral resin material, a melamine resin material, and a nylon resin material, etc. One of these base materials may be used alone, or alternatively, a combination of two or more of these materials may be used in a copolymer or in a blend, etc.

The conductive agent is not particularly limited, and examples of the conductive agent include carbon black such as acetylene black, Ketjen black, and Tokablack, etc., carbon nanotube, lithium salt such as a lithium perchlorate material, etc., ionic liquid such as 1-butyl-3-methylimidazolium hexafluorophosphate, etc., metal oxide material such as a tin oxide material, etc., and conductive polymer. One of these conductive agents may be used alone, or alternatively, a combination of two or more of these conductive agents may be used in a mixture, etc.

The surface roughness imparting materials 21*c*2 are not particularly limited, and examples of the surface roughness imparting materials 21*c*2 include acrylic particles, urethane particles, polyamide resin particles, silicone resin particles, fluororesin particles, styrene resin particles, phenol resin particles, polyester resin particles, olefin resin particles, epoxy resin particles, nylon resin particles, silica particles, kaolin clay particles, diatomaceous earth particles, glass beads, and hollow glass spheres, etc. One kind of particle among these kinds of particles may be used alone, or alternatively, a combination of two or more kinds of particles among these kinds of particles may be used. The surface roughness imparting materials 21*c*2 described above have electrical insulating properties; however, the surface roughness imparting materials 21*c*2 are not limited to this, and it may be conductive. The surface roughness imparting materials 21*c*2 may be carbon particles, graphite particles, carbon balloons, alumina particles, titanium oxide particles, zinc oxide particles, magnesium oxide particles, zirconium oxide particles, calcium sulfate particles, calcium carbonate particles, magnesium carbonate particles, calcium silicate particles, aluminum nitride particles, boron nitride particles, or talc particles, etc.

The surface layer 21*c* is formed from a coating liquid in which the resin composition described above is dissolved in a solvent, and in addition, in which the surface roughness imparting materials 21*c*2 described above are dispersed. Specifically, the coating liquid is applied onto the outer surface 2*s* of the base 2, and it is then cured or solidified, thereby forming the surface layer 21*c*. The coating liquid is stirred using, for example, ultrasound. The coating liquid is cured or solidified, for example, by drying at a temperature in a range of 80 degrees Celsius or greater and 160 degrees Celsius or less for a time in a range of 20 minutes or greater and 60 minutes or less.

A method of applying the coating liquid is not particularly limited, and examples of the method include a dip coating method, a roller coating method, and a spray coating method, etc. To cure or solidify the coating liquid, a heating treatment, an ultraviolet irradiation treatment, etc., may be performed as appropriate.

The solvent to be used for the coating liquid is not particularly limited, and examples of the solvent include an aqueous-based solvent such as water, etc., an ester-based solvent such as methyl acetate, ethyl acetate, or butyl acetate, etc., a ketone-based solvent such as methyl ethyl ketone (MEK) or methyl isobutyl ketone (MIBK), etc., an alcohol-based solvent such as methanol, ethanol, butanol, or 2-propanol (IPA), etc., a hydrocarbon-based solvent such as acetone, toluene, xylene, hexane, or heptane, etc., and a halogenated solvent such as chloroform, etc. One of these solvents may be used alone, or alternatively, a combination of two or more of these solvents may be used in a mixture, etc.

As described above, the charging roller 21, which is an example of the conductive roller, includes the base 2 including the outer surface 2*s* along the axial line AX and the surface layer 21*c* arranged on the outer surface 2*s* of the base 2. In the charging roller 21, the surface roughness of the outer surface 2*s* of the base 2 and the surface roughness of the outer surface 21*s* of the surface layer 21*c* are each set in a predetermined range.

Specifically, the ten-point height of irregularities Rz of the outer surface 2*s* of the base 2 is greater than or equal to 6.0 micrometers and less than or equal to 8.0 micrometers. The ten-point height of irregularities Rz of the outer surface 21*s* of the surface layer 21*c* is greater than or equal to 5.5 micrometers and less than or equal to 8.5 micrometers. The ten-point height of irregularities Rz is measured in accordance with JIS B 0601 (1994).

Each of the ten-point height of irregularities Rz of the outer surface 2*s* of the base 2 and the ten-point height of irregularities Rz of the outer surface 21*s* of the surface layer 21*c* is in the corresponding range described above; consequently, average particle size and content of surface roughness imparting materials 21*c*2 can decrease easily compared to a conventional one. Thus, the density of the surface roughness imparting materials 21*c*2 can decrease compared to the conventional one. Therefore, it is possible to reduce an occurrence of high resistance caused by an increase in the density of the surface roughness imparting materials 21*c*2. As a result, the discharge increases, thereby obtaining electric potential required for the surface of the photoreceptor 10. Since the density of the surface roughness imparting materials 21*c*2 can decrease easily compared to the conventional one, it is possible to increase an area of a portion of the conductive portion 21*c*1 having no surface roughness imparting materials 21*c*2. Therefore, the number of discharge points can be increased.

In the charging roller 21, each of the ten-point height of irregularities Rz of the outer surface 2*s* of the base 2 and the ten-point height of irregularities Rz of the outer surface 21*s* of the surface layer 21*c* is in the corresponding range described above; consequently, variations in discharge gap G can be reduced over the entire outer surface 21*s* of the surface layer 21*c*. Thus, the surface of the photoreceptor 10 can be evenly charged by using the charging roller 21. Therefore, image unevenness can be reduced by using the charging roller 21.

On the other hand, if the ten-point height of irregularities Rz of the outer surface 2*s* is greater than the upper limit value described above, a shortage of discharge may occur locally at the outer surface 21*s*, and scumming may occur. Specifically, if a shortage of discharge occurs locally at the outer surface 21*s*, a portion of the surface of the photoreceptor 10, to which toner is electrostatically attached, easily occurs. As a result, the density of the image corresponding to the portion is dense.

If the ten-point height of irregularities Rz of the outer surface 2*s* is less than the lower limit value described above, excessive discharge may occur locally at the outer surface 21*s*, and local discharge may occur. Specifically, if the excessive discharge occurs locally at the outer surface 21*s*, the electric potential on the surface of the photoreceptor 10 may not be completely removed in a process of forming a latent image by the exposure device 30. Thus, the charged toner may be electrostatically repelled, resulting in a latent image, which is formed on the surface of the photoreceptor 10, having a portion to which the toner is not attached. As a result, the density of the image corresponding to the portion is faint.

In addition, if the ten-point height of irregularities Rz of the outer surface 2*s* of the base 2 is outside the range describe above, it is difficult to adjust the ten-point height of irregularities Rz of the outer surface 21*s* of the surface layer 21*c* within the range described above, compared to a case in which the ten-point height of irregularities Rz of the outer surface 2*s* of the base 2 is in the range described above.

As long as each of the ten-point height of irregularities Rz of the outer surface 2*s* of the base 2 and the ten-point height of irregularities Rz of the outer surface 21*s* of the surface layer 21*c* is in the corresponding range described above, the average particle size and content of the surface roughness imparting materials 21*c*2 are not particularly limited.

As described above, the charging roller 21 includes the core member 21*a* and the conductive elastic layer 21*b*. Including the elastic layer 21*b* makes it easier to equalize the discharge gap G in the direction along the axial line AX, compared to a case in which the elastic layer 21*b* is not included. Thus, electricity can be evenly charged or discharged to the outer surface of the photoreceptor 10 by using the charging roller 21. As a result, image unevenness can be reduced compared to a conventional method.

Furthermore, as described above, the surface layer 21*c* includes the conductive portion 21*c*1 including the resin material and the conductive material. Thus, since the surface roughness imparting materials 21*c*2 in a dispersed state can be fixed to the elastic layer 21*b*, variations in the ten-point height of irregularities Rz can be reduced in the entire outer surface 21*s* of the surface layer 21*c*.

In the example shown in FIG. 3, the surface roughness imparting materials 21*c*2 are partially exposed to the outside from the conductive portion 21*c*1; however, the surface roughness imparting materials 21*c*2 may be embedded entirely in the conductive portion 21*c*1.

The content of the surface roughness imparting materials 21*c*2 in the surface layer is preferably greater than or equal to 2.0 percent by mass and less than or equal to 10.0 percent by mass. When such content is in the range described above, it is easier to adjust each ten-point height of irregularities Rz of the outer surface 21*s* of the surface layer 21*c* in the range described above, compared to a case in which the content is outside the range.

The ten-point height of irregularities Rz of the outer surface 21*s* of the surface layer 21*c* is preferably less than the ten-point height of irregularities Rz of the outer surface 2*s* of the base 2. This makes it easier to adjust each ten-point height of irregularities Rz of the outer surface 21*s* of the surface layer 21*c* in the range described above, compared to a case in which the ten-point height of irregularities Rz of the outer surface 21*s* is greater than the ten-point height of irregularities Rz of the outer surface 2*s*.

The ten-point height of irregularities Rz of the outer surface 21*s* of the surface layer 21*c* may be greater than or equal to the ten-point height of irregularities Rz of the outer surface 2*s* of the base 2.

In addition, resistance values of the base 2 and the surface layer 21*c*, in other words, the resistance value of the entire charging roller 21, is not particularly limited, and it may be in a range of, for example, 4.5 log Ω to 5.5 log Ω. The resistance value varies depending on, for example, the ten-point height of irregularities Rz of the outer surface 21*s*, the average particle size and content of the surface roughness imparting materials 21*c*2, and an average thickness of the surface layer 21*c*.

In the image forming apparatus 100 including the charging roller 21 and the photoreceptor 10, the charging roller 21 has the outer surface of the photoreceptor 10 electrically charged by applying a voltage between the charging roller 21 and the outer surface of the photoreceptor 10. The voltage, in other words, a charging voltage, may be a DC voltage, or may be a voltage obtained by superimposing an AC voltage on a DC voltage. In a case in which the charging voltage is a DC voltage, compared to in a case in which the charging voltage is a voltage obtained by superimposing an AC voltage on a DC voltage, charging unevenness often readily occurs. However, by using the charging roller 21, it is possible to reduce image unevenness even when the charging voltage is a DC voltage.

3. Modifications

The embodiment described above may be variously modified. Specific modifications, which can be applied to the embodiment described above, are described below. Two or more modifications freely selected from the following modifications may be combined as long as no conflict arises from such combination.

3-1. First Modification

In the embodiments described above, an example of a case is shown in which the conductive roller according to the present invention is applied to the charging roller; however, the present invention is not limited to this example. The conductive roller according to the present invention is applicable to, for example, a developing roller, a transfer roller, a static electrical charge elimination roller, a toner supply roller, etc., in addition to the charging roller of the image forming apparatus such as an electrophotographic copier or printer.

3-2. Second Modification

In the embodiment described above, a configuration is shown in which the charging roller is in contact with the outer surface of the photoreceptor; however, the present invention is not limited to the configuration, and a configuration may be used in which the conductive roller is close to the outer surface of the photoreceptor. For example, in a case in which the conductive roller is a developing roller, a developing method may be a contact method or a non-contact method.

3-3. Third Modification

In the embodiment described above, the image forming apparatus is a monochromatic image forming apparatus; however, the image forming apparatus may be a color image forming apparatus. In a case in which the image forming apparatus is a color image forming apparatus, the image forming apparatus may use a rotary developing method or a tandem developing method. In a case in which the image forming apparatus includes intermediate transfer elements, the conductive roller may be applied to a primary transfer roller or to a secondary transfer roller. Furthermore, the image forming apparatus may use either wet toner or dry toner, and the toner may be a magnetic or a non-magnetic one-component developer or a two-component developer.

EXAMPLES

Specific examples of the present invention will be described below. The present invention is not limited to the following examples.

A. Manufacture of Conductive Roller

A-1. First Example

Manufacture of Elastic Layer

First, a rubber composition was kneaded with a roller mixer. The rubber composition included the following constituents.

- Epichlorohydrin rubber ("Epichlomer CG-102" manufactured by Osaka Soda Co., Ltd.) used as a rubber material: 100 parts by mass
- Sodium trifluoroacetate used as a conductivity imparting agent: 0.5 parts by mass
- Zinc oxide used as a crosslinking aid: 3 parts by mass
- Stearic acid used as a crosslinking aid: 2 parts by mass
- Crosslinking agent: 1.5 parts by mass The kneaded rubber composition was formed into a sheet-shaped material, and it was then wound around the surface of a core member having a diameter of 8 mm, and it was then press-molded to form a layer made of crosslinked epichlorohydrin rubber. Thereafter, the surface of the layer was ground with a grinding machine to form an elastic layer having a thickness of 2 mm. In the grinding process, after the thickness of the elastic layer became a predetermined thickness, the rotation speed of a grinding wheel of the grinding machine was increased in sequence from 1000 rpm, to 2000 rpm, to 3000 rpm to grind the surface of the elastic layer by dry grinding.

The hardness of the resulting elastic layer was measured using a durometer "Type A" according to JIS K 6253 or ISO 7619; as a result, the measured hardness was in a range from 50° to 64°.

Measurement of the ten-point height of irregularities Rz of the outer surface of a base was carried out as follows. Using a contact-type surface roughness measuring machine (Surf Coder "SE-500" manufactured by Kosaka Laboratory Ltd.), the ten-point height of irregularities Rz of the outer surface of the base was measured under the following measurement conditions.

Measurement Conditions

- Cutoff: $\lambda c$=2.5 mm
- Measurement length. 7.5 mm
- Measurement speed. 0.5 mm/sec
- Measurement positions: the ten-point height of irregularities Rz was measured at 3 points per conductive roller, and an average value of the ten-point height of irregularities Rz was calculated at the 3 points. The average value, in other words, the ten-point height of irregularities Rz of the outer surface of the base, was 6.5 micrometers.

Manufacture of Surface Layer

First, a coating liquid for forming a surface layer was prepared. The coating liquid included the following constituents.

- Ethyl acetate used as a diluted solvent: 60.0 parts by mass
- Urethane resin used as a resin material: 19.9 parts by mass [polyol ("T5650E" manufactured by Asahi Kasei Chemicals Corp.): 10.8 parts by mass, and isocyanurate ("TPA-100" manufactured by Asahi Kasei Chemicals Corp.): 9.1 parts by mass]
- Carbon dispersion liquid ["MHI-BK" (carbon inclusion rate of 20 to 30% by mass) manufactured by Mikuni Color Ltd.] used as a conductive material: 18.4 parts by mass
- Acrylic silicone polymer ("modiper FS700" manufactured by NOF Corp.) used as an additive: 1.0 parts by mass Urethane beads (manufactured by Negami Chemical Industrial Co., Ltd.) used as a surface roughness imparting agent with an average particle size of 3 micrometers: 2.0 parts by mass The coating liquid having the constituents described above was stirred using a ball mill for 3 hours. The content of urethane beads used as the surface roughness imparting agent in the coating liquid was 0.5% by mass.

By forming a surface layer on the outer surface of the elastic layer described above using the coating liquid, a conductive roller was formed. Specifically, the stirred coating liquid was applied by spray coating on the outer surface of the base, and it was then dried in an electric furnace at 120 degrees Celsius for 60 minutes to form the surface layer having an average thickness of 5.0 micrometers. The content of urethane beads used as the surface roughness imparting agent in the surface layer was 2.0% by mass.

The average thickness of the surface layer was measured by, first, observing a cross section of the elastic layer and a cross section of the surface layer taken along a line in their thickness direction with a laser microscope ("VK-X200" manufactured by Keyence Corporation), and then, measuring distances from the outer surface of the surface layer to a boundary between the surface layer and the elastic layer at 20 different points in a circumferential direction of the surface layer, and then, calculating an average value of the measured distances. The measured area is 200.0×285.1 micrometers. The measurement magnification is 1000 times.

Measurement of the ten-point height of irregularities Rz of the outer surface of the surface layer was carried out as follows. Using a contact-type surface roughness measuring machine (Surf Coder "SE-500" manufactured by Kosaka Laboratory Ltd.), the ten-point height of irregularities Rz of the outer surface of the surface layer was measured under the following measurement conditions.

Measurement Conditions

Cutoff: $\lambda c$=2.5 mm

Measurement length. 7.5 mm

Measurement speed. 0.5 mm/sec

Measurement positions: the ten-point height of irregularities Rz was measured at 3 points per conductive roller, and an average value of the ten-point height of irregularities Rz was calculated at the 3 points. The average value, in other words, the ten-point height of irregularities Rz of the outer surface of the base, was 5.7 micrometers.

Measurement of the resistance value of the conductive roller was carried out as follows. Specifically, a metal roller formed of stainless steel (SUS) with a diameter of 30 mm was first prepared. Next, an axial line of the conductive roller and an axial line of the metal roller were arranged in parallel, and then the conductive roller and the metal roller were brought into contact. A 4.9 N load was applied from the conductive roller toward the metal roller to each of the end of the core member included in the conductive roller. Consequently, the total load was 9.8 N. A resistance meter was connected to one end of the core member included in the conductive roller and to one end of the metal roller. The charging roller 21 and the metal roller were then rotated at a peripheral speed of 47.1 mm/s. In this state, a voltage of 200 V was applied, and the resistance value during the application of the voltage was measured by the resistance meter. The resistance value was 4.55 log Ω. The measured temperature was 23 degrees Celsius and the humidity was 55%. The resistance meter is a digital electrometer "8340A" manufactured by ADC Corp.

A-2. Second to Fourth Examples, and First and Sixth Comparative Examples

Conductive rollers according to second to fourth examples, and conductive rollers according to first and sixth comparative examples were manufactured in substantially the same manner as the first example. However, the ten-point height of irregularities Rz of the outer surface of the base, the ten-point height of irregularities Rz of the outer surface of the surface layer, the resistance value, the average particle size of the surface roughness imparting materials, the content of the surface roughness imparting materials in the surface layer, and the average thickness of the surface layer were changed into values as listed in Table 1.

TABLE 1

| | | | | Surface roughness imparting materials | | | Image unevenness | | |
|---|---|---|---|---|---|---|---|---|---|
| | Roughness of base µm | Roughness of surface layer µm | Resistance value logΩ | Average particle size µm | Content % by mass | Thickness of surface layer µm | Local electric discharge — | Scumming — | Overall evaluation |
| First comparative example | 2.0 | 2.4 | 4.50 | 3 | 2 | 3 | F | P | F |
| Second comparative example | 2.0 | 3.1 | 4.79 | 3 | 6 | 3 | F | P | F |
| Third comparative example | 2.0 | 7.3 | 5.15 | 6 | 4 | 3 | P | F | F |
| Fourth comparative example | 5.0 | 4.0 | 4.91 | 3 | 2 | 5 | F | P | F |
| First example | 6.5 | 5.7 | 4.55 | 3 | 2 | 5 | P | P | P |
| Second example | 7.0 | 5.5 | 4.55 | 3 | 2 | 5 | P | P | P |
| Third example | 6.0 | 5.8 | 4.61 | 3 | 10 | 5 | P | P | P |
| Fourth example | 8.0 | 8.5 | 4.61 | 3 | 10 | 5 | P | P | P |

TABLE 1-continued

| | | | | Surface roughness imparting materials | | | Image unevenness | | |
|---|---|---|---|---|---|---|---|---|---|
| | Roughness of base µm | Roughness of surface layer µm | Resistance value logΩ | Average particle size µm | Content % by mass | Thickness of surface layer µm | Local electric discharge — | Scumming — | Overall evaluation |
| Fifth comparative example | 9.7 | 9.3 | 4.52 | 3 | 2 | 5 | P | F | F |
| Sixth comparative example | 12.0 | 14.7 | 4.62 | 3 | 10 | 5 | P | F | F |

B. Evaluation of Conductive Rollers

Image unevenness was evaluated for images printed by a copier ("A3-MFP" manufactured by Sharp Corp.) used the conductive roller according to each of the examples or each of the comparative examples as a charging roller. The copier used a DC voltage as a charging voltage. Printing was performed at a print rate of 20 sheets per minute at an environmental temperature of 23 degrees Celsius and a humidity of 55%.

B-1. Presence or Absence of Image Unevenness Caused by Local Electric Discharge Halftone images were printed, and then evaluation was performed by visually determining, based on the following criteria, whether white spots, black spots, white streaks, or black streaks, which appeared on the printed images as image unevenness caused by local electric discharge, were present. A summary of the evaluation results is shown in Table 1.

Criteria

P: No image unevenness caused by local discharge.

F: Image unevenness caused by local discharge.

B-2. Presence or Absence of Image Unevenness Caused by Scumming

White solid images were printed, and then evaluation was performed by visually determining whether image unevenness caused by scumming was present. A summary of the evaluation results is shown in Table 1 described above.

Criteria

P: No scumming

F: Scumming

The "scumming" is also referred to as "fogging," and means printing on a non-print area. When scumming appears on a printed solid white image, lightness of the printed image decreases.

B-3. Overall Evaluation

Overall evaluation was defined as P in a case in which the evaluation in B-1 described above and the evaluation in B-2 described above were both P, whereas the overall evaluation was defined as F in cases other than the case described above. A summary of the evaluation results is shown in Table 1 described above.

It is understood from the above evaluation results that image unevenness could be reduced in each of the examples as shown in Table 1. In contrast to these results, image unevenness appeared in each of the comparative examples.

DESCRIPTION OF REFERENCE SIGNS

10 . . . photoreceptor, 20 . . . charging device, 21 . . . charging roller, 2 . . . base, 2*s* . . . outer surface, 21*a* . . . core member, 21*b* . . . elastic layer, 21*c* . . . surface layer, 21*c*1 . . . conductive portion, 21*c*2 . . . surface roughness imparting material, 21*s* . . . outer surface, 30 . . . exposure device, 40 . . . developing device, 41 . . . container, 42 . . . developing roller, 43 . . . toner supply roller, 44 . . . regulation blade, 50 . . . transfer device, 51 . . . transfer roller, 60 . . . cleaning device, 61 . . . cleaning blade, 62 . . . collector, 100 . . . image forming apparatus, AX . . . axial line, G . . . discharge gap, M . . . recording medium, N . . . nip, R1 . . . region, R2 . . . region, T . . . toner.

The invention claimed is:

1. A conductive roller comprising:

a base including an outer surface along and about an axial line thereof; and a surface layer arranged on the outer surface of the base, wherein:

the base includes a core member and a conductive elastic layer arranged between the core member and the surface layer, the surface layer includes particles, a ten-point height of irregularities Rz of the outer surface of the base is greater than or equal to 6.0 micrometers and less than or equal to 8.0 micrometers, a ten-point height of irregularities Rz of an outer surface of the surface layer is greater than or equal to 5.5 micrometers and less than or equal to 5.8 micrometers, and a thickness of the conductive elastic layer is greater than or equal to 0.5 millimeters and less than or equal to 5 millimeters.

2. The conductive roller according to claim 1, wherein the surface layer includes a conductive portion including a resin material and a conductive agent.

3. The conductive roller according to claim 1, wherein the ten-point height of irregularities Rz of the outer surface of the surface layer is less than the ten-point height of irregularities Rz of the outer surface of the base.

4. A conductive roller comprising:

a base including an outer surface along and about an axial line thereof; and a surface layer arranged on the outer surface of the base, wherein:

the base includes a core member and a conductive elastic layer arranged between the core member and the surface layer, the surface layer includes surface roughness imparting materials as particles, and a content of the surface roughness imparting materials is greater than or equal to 2.0 percent by mass and less than or equal to 10.0 percent by mass, a ten-point height of irregularities Rz of the outer surface of the base is greater than or equal to 6.0 micrometers and less than or equal to 8.0 micrometers, a ten-point height of irregularities Rz of an outer surface of the surface layer is greater than or equal to 5.5 micrometers and less than or equal to 8.5 micrometers, and a thickness of the conductive elastic layer is greater than or equal to 0.5 millimeters and less than or equal to 5 millimeters.

5. A conductive roller comprising:

a base including an outer surface along and about an axial line thereof; and a surface layer arranged on the outer surface of the base, wherein:

the base includes a core member and a conductive elastic layer arranged between the core member and the surface layer, the surface layer includes particles, a ten-point height of irregularities Rz of the outer surface of the base is greater than or equal to 6.0 micrometers and less than or equal to 8.0 micrometers, a ten-point height of irregularities Rz of an outer surface of the surface layer is greater than or equal to 5.5 micrometers and less than or equal to 8.5 micrometers, a thickness of the conductive elastic layer is greater than or equal to 0.5 millimeters and less than or equal to 5 millimeters, and a durometer hardness of the conductive elastic layer is greater than or equal to 50° and less than or equal to 64°.

* * * * *